(12) United States Patent
Park et al.

(10) Patent No.: US 7,265,858 B2
(45) Date of Patent: Sep. 4, 2007

(54) METHOD AND SYSTEM TO ACCESS ADDRESS BOOKS

(75) Inventors: David Park, Torrance, CA (US); Truc D. Nguyen, San Diego, CA (US)

(73) Assignees: Kabushiki Kaisha Toshiba (JP); Toshiba Tec Kabushiki Kaisha (JP)

(*) Notice: Subject to any disclaimer, the term of this patent is extended or adjusted under 35 U.S.C. 154(b) by 1008 days.

(21) Appl. No.: 09/970,099

(22) Filed: Oct. 3, 2001

(65) Prior Publication Data

US 2003/0065786 A1 Apr. 3, 2003

(51) Int. Cl.
*G06F 3/12* (2006.01)

(52) U.S. Cl. ............... 358/1.15; 358/440; 358/403; 358/407; 358/462; 707/204; 707/8; 707/10; 707/104; 707/200; 709/208

(58) Field of Classification Search ............ 358/440, 358/403, 407, 462, 1.15; 707/204, 8, 10, 707/104, 200; 709/208
See application file for complete search history.

(56) References Cited

U.S. PATENT DOCUMENTS

| | | | | |
|---|---|---|---|---|
| 5,781,908 | A | * | 7/1998 | Williams et al. ............ 709/223 |
| 5,960,167 | A | | 9/1999 | Roberts et al. |
| 5,995,240 | A | * | 11/1999 | Sato ........................ 358/407 |
| 6,021,429 | A | * | 2/2000 | Danknick ................... 709/208 |
| 6,067,582 | A | | 5/2000 | Smith et al. |
| 6,073,141 | A | * | 6/2000 | Salazar ..................... 707/204 |
| 6,094,548 | A | | 7/2000 | Gunning et al. |
| 6,134,017 | A | | 10/2000 | Schlank et al. |
| 6,181,893 | B1 | | 1/2001 | Collard et al. |
| 6,247,043 | B1 | * | 6/2001 | Bates et al. ................. 709/200 |
| 6,247,135 | B1 | | 6/2001 | Feague |
| 6,259,449 | B1 | | 7/2001 | Saxena et al. |
| 6,269,369 | B1 | * | 7/2001 | Robertson ................... 707/10 |
| 6,275,869 | B1 | | 8/2001 | Sieffert et al. |
| 6,654,789 | B1 | * | 11/2003 | Bliss et al. ................. 709/206 |
| 6,687,362 | B1 | * | 2/2004 | Lindquist et al. ...... 379/218.01 |
| 2001/0002469 | A1 | * | 5/2001 | Bates et al. ..................... 707/1 |
| 2003/0084049 | A1 | * | 5/2003 | Wiley ........................ 707/10 |

* cited by examiner

*Primary Examiner*—Kimberly A. Williams
*Assistant Examiner*—Michael Burleson
(74) *Attorney, Agent, or Firm*—Tucker Ellis & West LLP

(57) ABSTRACT

There is provided a method and system for initiating an information transmission, such as with faxing, e-mail, data streaming, or the like from a personal computer on a network having at least one networked multifunction machine. The method comprises the steps of invoking a fax command from a software program on a personal computer and then viewing a list of machines residing on the network which contain local address book information. Upon viewing the list, a machine is selected from the list and a search is conducted through the personal computer for a local copy of the selected machine's address book information. If no local copy exists, a local copy of the selected machine's address book information is created on the personal computer. The local copy of the selected machine's address book is then used to retrieve address book information for selecting a recipient of an information transmission.

14 Claims, 2 Drawing Sheets

METHOD AND SYSTEM TO ACCESS ADDRESS BOOKS

BACKGROUND OF THE INVENTION

This invention pertains generally to multifunction printers and fax machines, and more particularly to a method for allowing users to access address books stored on multifunction machines.

Many organizations use multifunction printers ("MFPs") which often incorporate printing, copying and faxing capabilities into a single machine. These machines allow for users on a network to fax directly from within software applications. Client machines on a network are generally equipped with fax drivers which accesses address book information on the client machines. MFP machines often contain their own address books that allow walk-up users to enter and store names and fax numbers, or select from a list of stored names and fax numbers, when sending a fax. In such environments, the address books stored on the MFPs and the address books stored on the client machines are completely separate from one another and have no connectivity. Further complicating matters is that many large organizations have a multitude of client machines and MFPs. Maintaining a central database of address book information for all users and all MFPs is an intensive task. In order to keep a central database current, it must poll all users and all MFPs regularly. This polling creates additional and undesirable network traffic. Furthermore, a central database can easily become so large that it is cumbersome to use and search, making it difficult to find specific information.

One solution to these problems is to create a number of subnetworks or user groups. While this solution localizes address book information to a user group, it prevents users from utilizing address book information from machines outside their user group. Furthermore, the task of delineating the user groups and access to address book information falls squarely upon the shoulders of network administrators, who are often unaware of the preferences and desires of the users in the various groups. Even when network administrators are able to work closely with user groups, the individual members of a particular user group may not be able to agree on which machines and address books should be accessible to their group. It would be preferable if the individual users could decide which address books they would like to access in a real time basis.

SUMMARY OF THE INVENTION

According to the present invention, there is provided a method for initiating an information transmission, such as with faxing, e-mail, data streaming, or the like from a personal computer on a network having at least one networked multifunction machine. The method comprises the steps of invoking a fax command from a software program on a personal computer and then viewing a list of machines residing on the network which contain local address book information. Upon viewing the list, a machine is selected from the list and a search is conducted through the personal computer for a local copy of the selected machine's address book information. If no local copy exists, a local copy of the selected machine's address book information is created on the client machine. If a local copy already exists, it is compared with the machine's address book information. If the address book information is different, the local copy of the selected machine's address book is updated with the selected machine's address book information.

DETAILED DESCRIPTION OF THE INVENTION

The present invention involves a method and system for accessing and sharing address book information stored on peripherals or networked devices. In a preferred embodiment, a computer and multiple peripheral devices are connected to a network. The network suitably runs on any network operating system ("NOS") or mainframe system and suitably supports a myriad of software packages. Preferably the present invention is employed in a system where a user of personal computer ("PC") issues a PC facsimile ("fax") command to send a fax to a fax machine anywhere in the world. However, it will be appreciated that the system disclosure herein has broader application to any user initialized, addressed data communication, such as e-mail, telecommunication, data streaming sessions, or the like. While such diverse applications fall within the teachings hereof, detailed description will be made in reference to a facsimile system contemplated by the preferred embodiment.

According to the present invention, a fax is suitably sent from a PC through a network fax machine or multifunction peripheral ("MFP") device such as a combined copier/printer/fax device or the like. In one preferred embodiment, the user selects a "fax" command from a menu of command options, such as those used with a graphical user interface operating system. However, it should be understood that the present invention is not limited in this manner and could easily be adapted to systems employing a print function or the like, all without departing from the present invention.

Figure 1:
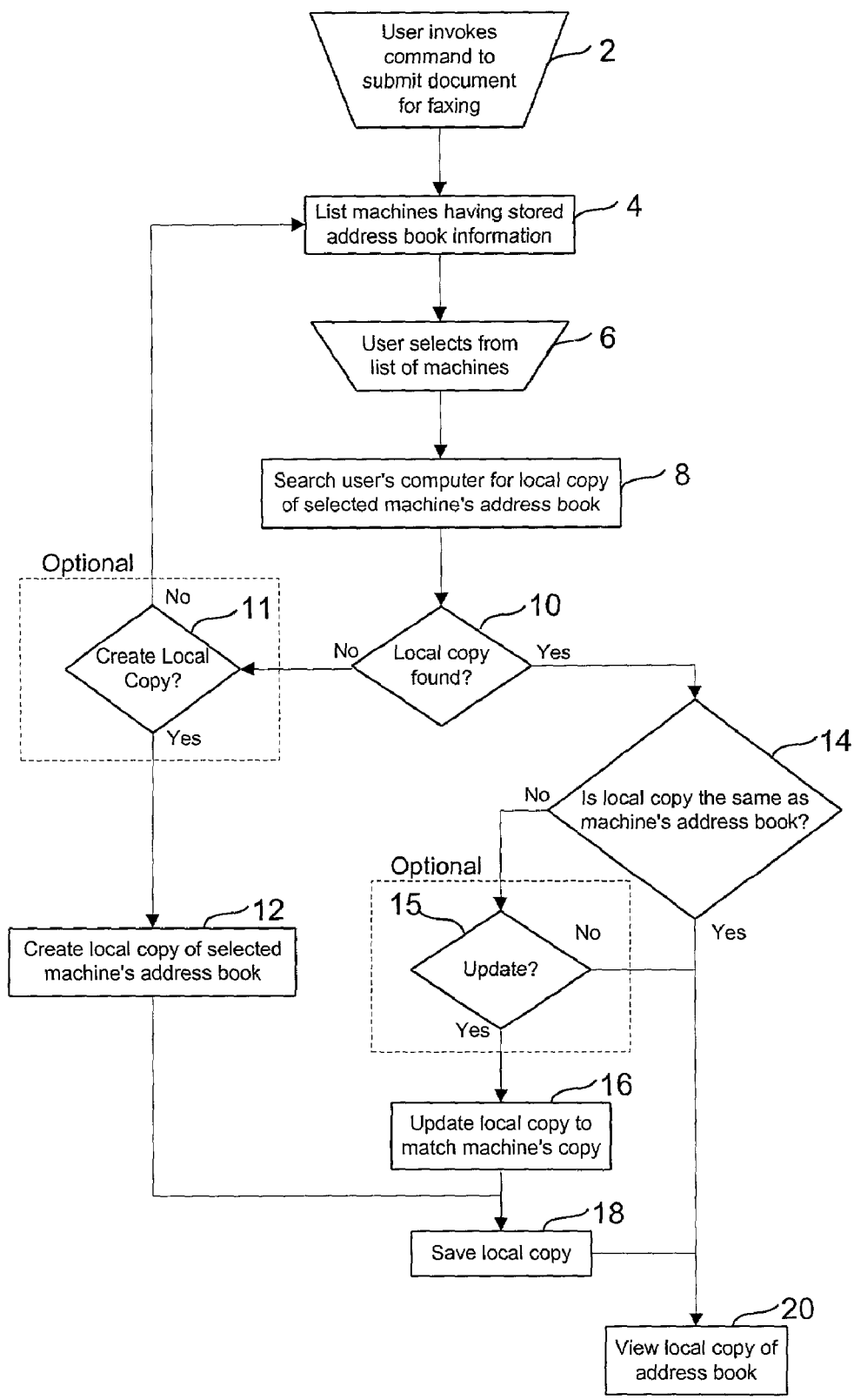
FIG. 1 is a flow chart representing the general process of providing a user with information contained in a selected address book.

Turning now to FIG. 1, a flow diagram of a method for accessing and sharing address book information across a network is disclosed. The basic flow commences at manual operation 2 when a user invokes a fax command from a software program on a PC and submits a document for faxing. In a preferred embodiment, the invokes a fax command by selecting a "fax" command from a menu of command options. Optionally, a user suitably invokes a fax command via a keyboard, such as one would in a text-based user interface, or via a mouse or other user input device, such as are known in the art. It should be understood that the software program is not limited to any particular application of type of application. The software program is suitably any type of program, including office suite software, text editors, or even the operating system itself, e.g. printing from a DOS environment. When a user invokes a fax command 2, an event is triggered prompting the user to select a fax recipient. In a preferred embodiment, a fax driver activates a fax dialog box that pops up to enable the user to select a recipient from a personal address book.

Flow progresses to process 4 where, in addition to the user's personal address book, the user views a list of accessible devices having locally stored address book information. Address book information suitably comprises fax numbers, names, addresses, phone numbers, e-mail addresses, as well as any other information typically stored in contact management programs known in the art. Preferably, the user interface for viewing the user's personal address book and the list of accessible devices is a graphical user interface, enabling the user to either scroll through a list of fax recipients and a list of accessible devices, or to select a fax recipient or accessible device by using a mouse or other input device to click on a graphical representation of a fax recipient or of an accessible device. The list of devices suitably comprises any device on a network, or any subset of devices to which the user has access. Preferably, walk-up fax machines, copiers, and MFP's that lack PC fax functionality but have locally stored address book information are included in the list of devices. Access to devices and the ability to view devices on a network are suitably controlled by network administration software, by fax driver software, or by both.

Flow then progresses to process 6 wherein the user then selects a machine or device from the displayed list. Again, the user suitably selects a device by using a keyboard, such as one would in a text-based user interface, or by using a mouse or other user input device, such as are known in the art. The selected device is preferably an MFP, but is suitably any copier, fax machine, or other peripheral device having address book information.

Upon the selection of a device, flow progresses to process 8, wherein a search is performed for a local copy of the selected device's address book information on the user's PC or on a networked drive accessible to the user. In a presently preferred embodiment, a fax driver searches the user's personal computer for a local copy of the selected device's address book information. Flow then progresses to decision block 10 where a determination is made whether the user's PC has a local copy of the selected device's address book information.

A negative determination at decision block 10 causes progression to process 12, wherein a local copy of the selected device's address book information is created on the user's PC. Optionally, a negative determination at decision block 10 causes progression to decision block 11, wherein a user decides whether or not to create a local copy of the selected device's address book information. Upon a negative response from the user, flow progresses back to process 4 where the user again views a list of accessible devices having locally stored address book information.

Upon a positive response at decision block 11, flow progresses to process 12, wherein a local copy of the selected device's address book is preferably created by transferring all of the address book information from the selected device to a local storage drive on the user's PC. A copy of the selected device's address book is also suitably created on a network drive accessible from the user's PC in addition to, or as a replacement for, the copy created on the local storage drive on the user's PC. In a preferred embodiment, the address book is created in a location, whether on the user's local PC, a network drive, or both, that is accessible to the user but not accessible to all network users such that network security is easily maintained.

Once created, the local copy or copies of the selected machine's address book information are saved in process 18. Flow then progresses to process 20 where the user views the saved address book information. Preferably, as in process 4, the user interface for viewing the saved address book information is a graphic user interface, enabling the user to either scroll through a list of fax recipients, or to select a fax recipient by using a mouse or other input device to click on a graphical representation of a fax recipient.

A positive determination at decision block 10 causes progression to decision block 14 where a determination is made whether the existing local copy matches the address book information of the selected device. This determination is suitably made through any one of a variety of comparative techniques known in the art, one of the simplest of which is comparing checksum information stored for each of the two address books. A positive determination at decision block 14 causes flow to progress to process 20.

A negative determination at decision block 14 causes flow to progress to process 16 where the local copy on the user's PC of the device's address book information is updated so that it matches the selected device's current address book information. Optionally, a negative determination at decision block 14 causes progression to decision block 15, wherein a user is prompted to decide whether or not to update the local copy of the selected device's address book information. Upon a negative response from the user, flow progresses back to process 20 where the user suitably views the existing local copy of the selected device's address book information.

A positive determination at decision block 15 causes progression to decision block 16, wherein the existing local copy user's the selected device's address book information is suitably updated through any available technique known in the art, such as database synchronization or replication. In a presently preferred embodiment, the entire address book from the selected device is copied so as to overwrite and replace the existing local copy.

Once updated, the local copy or copies of the selected machine's address book information are saved in process 18. Flow then progresses to process 20 where the user views the saved address book information.

After viewing the selected address book information, the user suitably selects one or more recipients from the selected address book for faxing. Should the user wish to send the same fax or a new fax to another recipient from an address book on another peripheral device, the user can again list all devices having stored address book information in process 4. The same progression from process 4 through process 20 follows for each selected device.

Figure 2:
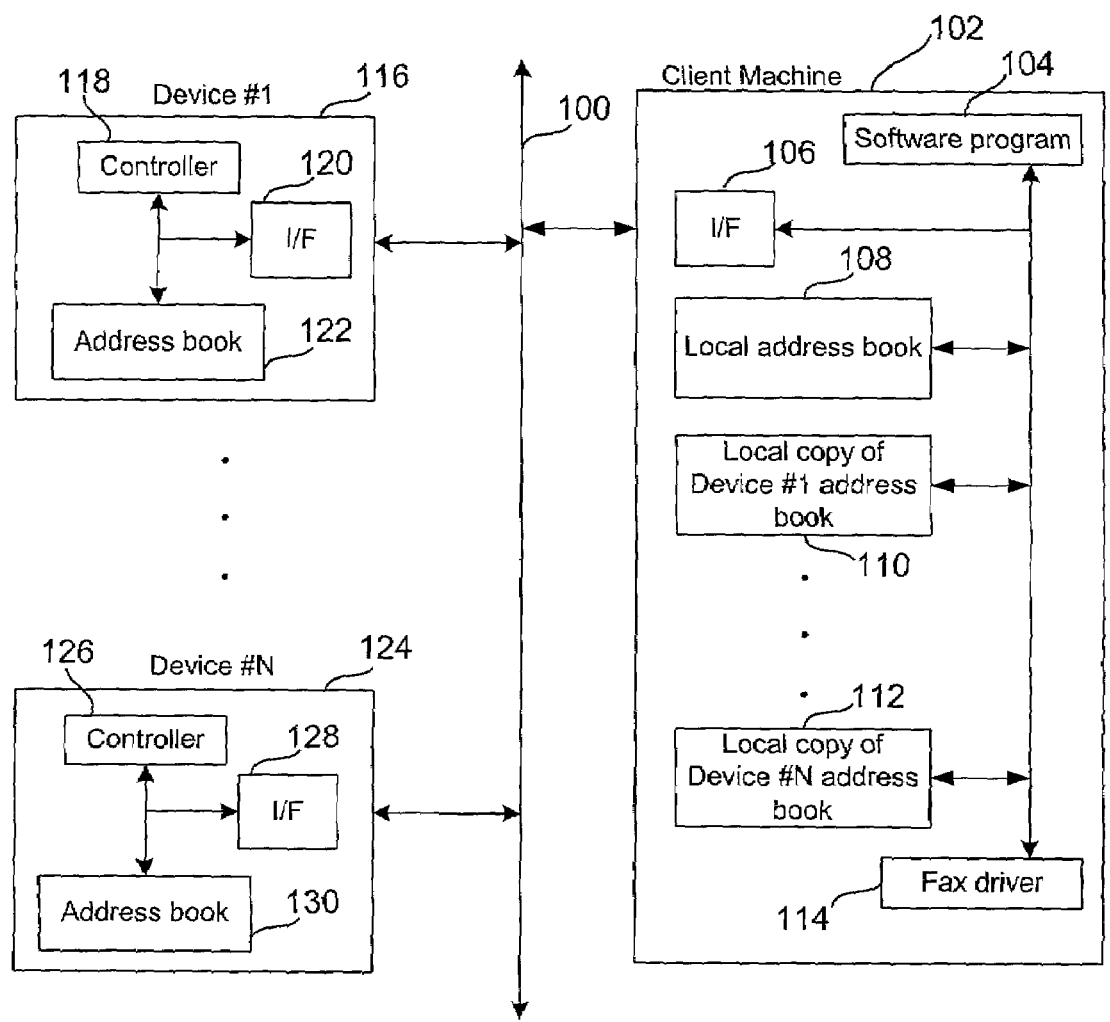
FIG. 2 is a diagram representing a network system for providing users with access to address books stored remotely on peripheral devices.

Turning now to FIG. 2, there is provided a diagram of a network system for practicing the present invention. The network 100 is illustrative of a LAN or WAN environment in which a preferred embodiment is provided. Connected to a network 100 are a client machine 102 and a plurality of devices 116 and 124. The network 100 is suitably any network and is suitably comprised of physical and transport layers such as illustrated by a myriad of conventional data transport mechanisms such Ethernet, Token-Ring™, 802.11 (b), or other wire-based or wireless data communication mechanisms as will be apparent to one of ordinary skill in the art. The client machine is suitably any type of computer, but is preferably a PC running an on a Windows, Unix, Macintosh, or Linux based operating system.

The client machine 102 is equipped with a software program 104, a fax driver 114, a personal address book 108, local copies of address books 110 and 112 of a plurality of peripheral devices 116 and 124, and a network connector 106. It should be noted that the fax driver 116 need not be loaded onto the PC. It is within the scope of the present invention if the PC accesses networked fax drivers 116 as opposed to local fax drivers 116. In addition, it is also within the scope of the present invention that the local address book 108 or local copies of address books 110 and 112 of a plurality of peripheral devices 116 and 124 are suitably stored on a network drive that is accessible to the user.

The network device is suitably any network device having an internal address book, such as a printer, copier, fax machine, or MFP. Preferably, the device 116 or 124 is not capable of executing PC fax commands. When a user at the client machine 102 invokes a "fax" command from a software program 104, the fax driver 114 is activated. The fax driver 114 preferably causes a selection window to be displayed on a computer monitor connected to the client machine 102. The user then selects an address book for selecting a recipient of the fax. The user then suitably selects a personal address book 108 or chooses from a list of devices on the network that have internal address book information. The list of devices is not limited to the devices from which there are local copies 110 and 112 of device address books on the user's PC. The list of devices is limited only by user access rights as created by a network administrator.

When a user selects a device 116 or 124 having an address book that the user wishes to view, the user's local hard drive or the storage location for the local copies of device address books is searched. Preferably, the fax driver 114 searches the user's PC. In addition, the address book information of the selected device 116 or 124 is searched. Preferably, the fax driver 114 queries selected devices and the user's PC. If no copy exists on the user's PC, a local copy 110 of the address book 122 of the selected device is created on the user's PC. Preferably, the fax driver 114 copies the address book information 122 from the selected device to the user's PC.

If a local copy 110 of the address book 122 of the selected device already exists on the user's PC, it is compared to the copy of the address book 122 stored on the selected device. If the address book information 110 on the PC is different than the address book information 122 on the selected device, the address book information 110 on the PC is updated to match that of the selected device. Preferably, the fax driver 114 compares the address book information. The updated local copy 110 of the address book information 122 of the selected device is then saved and displayed for the user. In a presently preferred embodiment, the fax driver 114 prompts the user to specify whether or not the address book information should be updated after determining that the copies 110 and 122 are different and prior to updating local copy 110 with the information from 122.

Although the preferred and alternate embodiments have been described in detail, it should be understood that various changes, substitutions and alterations can be made therein without departing from the spirit and scope of the invention as defined by the appended claims.

What is claimed is:

1. A method for accessing remote address book information comprising the steps of:
    outputting, on a data processing device, data representative of a plurality of available networked document processing devices for a selected document processing operation, each of the document processing devices having address book data in a storage associated therewith;
    receiving selection data representative of a selected document processing device;
    determining whether address book data of the selected document processing device is available in a storage associated with the data processing device;
    selectively copying address book data from the selected document processing device to the data processing device in accordance with the determination; and
    commencing operation of the document processing device to perform the selected document processing operation in accordance with at least one entry of address book data stored in the document processing device.

2. The method for accessing remote address book information of claim 1 wherein the address book data selectively copied from the selected document processing device is stored in associated storage of the data processing device.

3. The method for accessing remote address book information of claim 1 wherein the document processing device includes a facsimile device, a copying device, a printing device, and a multifunctional peripheral device.

4. The method for accessing remote address book information of claim 1 further comprising the steps of:
    comparing the address book data of the selected document processing device available in a storage associated with the data processing device with the address book data in a storage associated with the selected document processing device; and
    selectively updating the address book data available in a storage associated with the data processing device based on the comparison.

5. The method for accessing remote address book information of claim 4 wherein the step of selectively updating the address book data includes overwriting the address book data available in a storage associated with the data processing device with the address book data in a storage associated with the selected document processing device.

6. The method for accessing remote address book information of claim 1 wherein the address book data includes user names, user facsimile numbers, user electronic mail addresses, user telephone numbers, and user addresses.

7. The method for accessing remote address book information of claim 1 wherein the data representative of a plurality of available networked document processing devices is outputted via a graphical user interface.

8. A system for accessing remote address book information comprising:
    means adapted for outputting, on a data processing device, data representative of a plurality of available networked document processing devices for a selected document processing operation, each of the document processing devices having address book data in a storage associated therewith;
    means adapted for receiving selection data representative of a selected document processing device;
    means adapted for determining whether address book data of the selected document processing device is available in a storage associated with the data processing device;
    means adapted for selectively copying address book data from the selected document processing device to the data processing device in accordance with the determination; and
    means adapted for commencing operation of the document processing device to perform the selected document processing operation in accordance with at least one entry of address book data stored in the document processing device.

9. The system for accessing remote address book information of claim 8 wherein the address book data selectively copied from the selected document processing device is stored in associated storage of the data processing device.

10. The system for accessing remote address book information of claim 8 wherein the document processing device includes a facsimile device, a copying device, a printing device, and a multifunctional peripheral device.

11. The system for accessing remote address book information of claim 8 further comprising:
    comparison means adapted for comparing the address book data of the selected document processing device available in a storage associated with the data processing device with the address book data in a storage associated with the selected document processing device; and updating means adapted for selectively updating the address book data available in a storage associated with the data processing device based on the comparison.

12. The system for accessing remote address book information of claim 11 wherein updating means includes means adapted for overwriting the address book data available in a storage associated with the data processing device with the address book data in a storage associated with the selected document processing device.

13. The system for accessing remote address book information of claim 8 wherein the address book data includes user names, user facsimile numbers, user electronic mail addresses, user telephone numbers, and user addresses.

14. The system for accessing remote address book information of claim 8 wherein the data representative of a plurality of available networked document processing devices is outputted via a graphical user interface.

\* \* \* \* \*